June 17, 1941.  P. KOLLSMAN  2,246,366
TACHOMETER
Filed Nov. 2, 1939  2 Sheets-Sheet 1

INVENTOR
PAUL KOLLSMAN
BY
Furman Rinehart
ATTORNEY

INVENTOR
PAUL KOLLSMAN
BY Furman Rinehart.
ATTORNEY

Patented June 17, 1941

2,246,366

UNITED STATES PATENT OFFICE 2,246,366

TACHOMETER

Paul Kollsman, New York, N. Y., assignor to Square D Company, Detroit, Mich., a corporation of Michigan Application November 2, 1939, Serial No. 302,621
In Great Britain November 3, 1938

3 Claims. (Cl. 264—13)

This invention relates generally to tachometers or rate of motion indicators and more particularly to the type known as drag tachometers.

In such tachometers circular vibrations of the instrument such as may be produced when the instrument is fitted to an aeroplane are liable to produce an indicating error. Moreover, there is a tendency for the usual light calibrating spring to buckle if the indicating element makes as much as one and three-fourths revolution.

An object of the present invention is to provide an improved construction by which these disadvantages may be avoided.

In accordance with the invention the indicating element, which may be associated with a scale so as to give an indicating range over several revolutions, in lieu of being mounted on the shaft to which the calibrating spring is attached, is mounted on a shaft connected with the first-mentioned shaft through reduction gearing so that the shaft on which the indicating element is mounted may make a number of revolutions for each revolution of the shaft to which the calibrating spring is attached. The drag element may be connected to either of the shafts and the spring yieldingly biases the shafts into definite positions against the torque exerted at the drag element. The transmission from the one shaft to the other may be through an intermediate shaft in which case the indicating element and drag element may turn in the same direction.

Where an intermediate shaft is not provided and the two shafts rotate in opposite directions any error caused by friction torque on one shaft is counteracted by friction torque on the other shaft.

A second indicating element may be mounted on a third shaft and driven from either of these two shafts through gearing providing a ratio of movement of the second indicating element of say ten to one to the first indicating element and the scale may be graduated according to the decimal system.

The spring heretofore mentioned may be coiled around the shaft on which it acts with one end fixed to the shaft.

In one convenient and preferred embodiment of the invention employing means for compensating for errors, one indicating element is mounted on a shaft having a gear wheel thereon adapted to be driven from a second shaft having a larger gear wheel mounted thereon so that the first-mentioned shaft may rotate in the opposite direction through three or more revolutions. The second shaft is subject to torque by means of a drag element influenced by means of a magnet attached to a driving shaft. The driving shaft may be driven mechanically or electrically from the engine, or the like, the rate of motion of which is to be indicated. If desired, a second magnet surrounding the drag element may be mounted on the driving shaft.

Although the novel features which are believed to be characteristic of this invention will be particularly pointed out in the claims appended hereto, the invention itself as to its objects and advantages, and a manner in which it may be carried out, may be better understood by referring to the following description taken in connection with the accompanying drawings forming a part hereof, in which Fig. 1 is a side view of an illustrative embodiment in vertical section on line II—II of Fig. 2;

Figure 1:
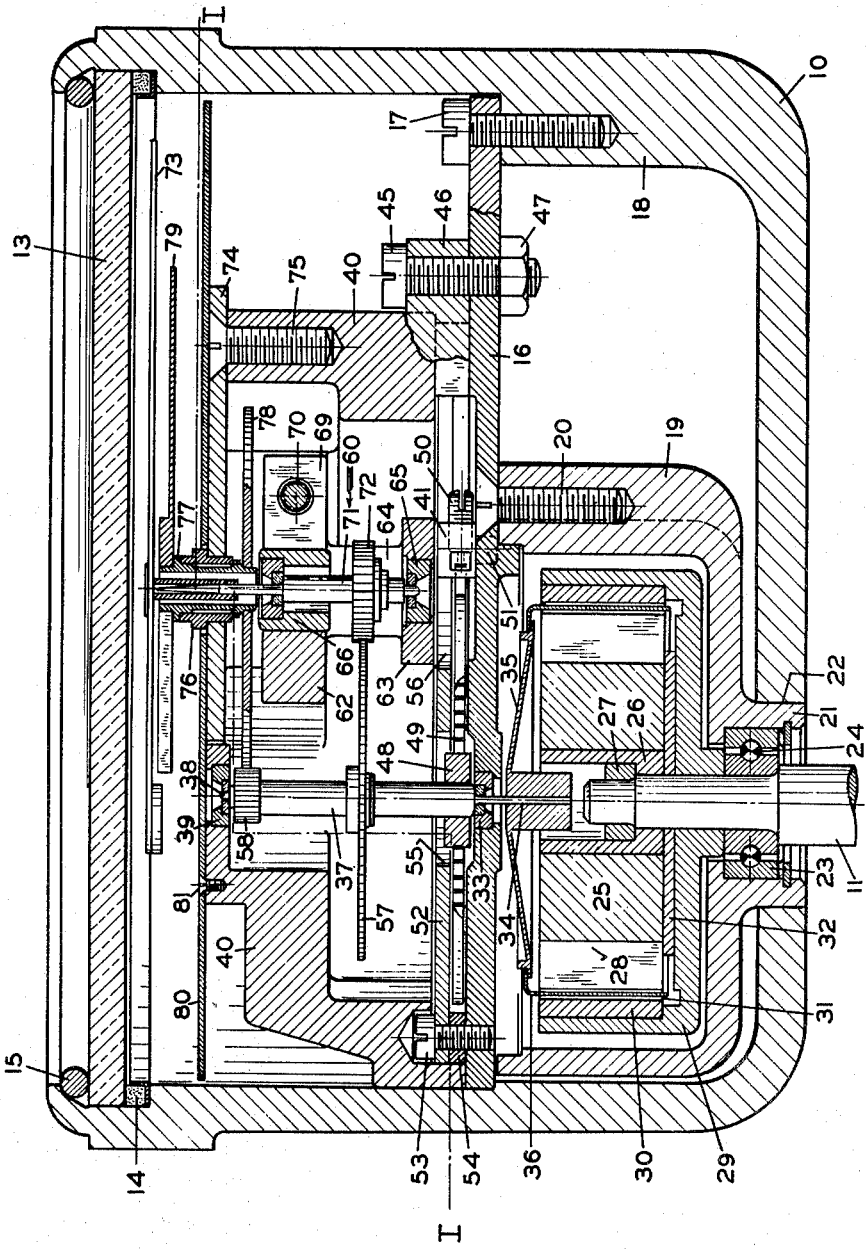

In the following description and in the claims, various details will be identified by specific names for convenience, but they are intended to be as generic in their application as the art will permit.

Like reference characters denote like parts in the several figures of the drawings.

Referring now to the drawings, the tachometer mechanism and the torque drive are mounted in a suitable casing 10, and operated by a rotatable shaft 11 extending beyond the exterior of the case. This shaft 11 may be caused to rotate by being driven (in a manner known in the art) mechanically or electrically from the engine or the like, the rate of motion of which is to be measured. The instrument may be mounted in accordance with standard practice in the instrument panel of an aeroplane by means of screws through the lugs 12 on the casing (see Fig. 3). The casing 10 may be closed by the glass 13 mounted on a ring gasket 14 and held in place by a split ring 15. A main partition 16 serves to carry the major portion of the internal mechanism and is secured as by screws 17 extending into a ledge 18 of the casing 10. A frame 19, secured to the main partition 16 as by screws 20, has an annular hollow shoulder 21 which is mounted in an opening 22 in the rear wall of the casing 10. Shaft 11 may rotate freely in a suitable journal 23 provided with ball bearings 24, and mounted in the annular hollow shoulder.

Mounted on the shaft 11 is a disc-shaped permanent magnet 25 having a machined soft steel core 26 which facilitates centering and securing the magnet to the shaft 11 as by nut 27. This permanent magnet has a plurality, preferably four, of symmetrically positioned notches dividing it into four salient poles 28 preferably of alternating polarity. A cup-shaped holder 29, of such metal as aluminum, is mounted on shaft 11. This cup-shaped member 29 mounts a ring 30 of machined magnetic material, such as soft iron, which is positioned to provide an annular space 31 between the disc magnet 25 and ring 30. A shunt disc 32 of nickel steel or other suitable magnetic material, the magnetic conductivity of which increases inversely with temperature change, may be mounted between the magnetic disc 25 and the cup-shaped holder 29.

This disc 32 preferably underlies and laps the poles 28 about one-fourth the depth of the notches heretofore mentioned. In its functioning the thickness and diameter of this shunting disc, as well as its material, may be chosen and proportioned so as to shunt away sufficient magnetism to compensate for changes in conductivity of the drag drum (described hereinafter) due to temperature change.

Mounted in an opening in the main supporting partition 16 is a jewel bearing 33 through which extends a spindle 34 upon which is mounted a rotor 35 mounting a cylindrical shell 36 thus providing what may be termed, for purposes of description, a magnetic drag drum. This shell is preferably made of a metal the co-efficient of electrical conductivity of which varies little with wide change in temperature. The drum is mounted so that the cylindrical shell 36 is freely rotatable in the annular space 31 between the permanent magnet disc 25 and the ring 30.

Integral with spindle 34 is a coaxial shaft 37 to which is fixed a coaxial spindle 38 mounted to rotate in a jewel bearing 39 which in turn is mounted in a frame 40. This frame 40, which is preferably of cast metal, is secured to the main supporting partition 16 as by screw bolts 45 extending through lugs 46 through openings in partition 16 and held secure as by nuts 47.

Fixedly mounted on shaft 37 (which shaft with its spindles 34 and 38 may for convenience of description be termed the magnetic drum shaft) is a relatively large gear 57 and a relatively small gear or pinion 58. Also fixedly mounted on this shaft is a hub 48. Around this hub is coiled a coil spring 49. The inner end of this spring, sometimes called in the art a calibrating spring, is fixed to hub 48 and the outer end is anchored to an anchor post 41 as by screw 50. Anchor post 41 is fixed to the main supporting partition by a pivot 51.

Adjacent the coil spring 49 is a plate 52 which may be mounted in spaced relation with the main supporting partition 16 by means of screws 53 and spacer washers 54. It may be noted that the plate 52 is provided with an opening 55 and a slot 56 to accommodate hub 48 and anchor post 41, respectively.

The coil spring 49 is mounted and adjusted in such manner that it exerts a biased torque on shaft 37 in a direction opposite to the torque of the magnetic drum as the magnet disc 25 is rotated by shaft 11 in response to the rotation of shaft 11. Moreover, the spring is adjusted so that the indicating elements will indicate zero when the instrument is not in operation.

Figure 2:
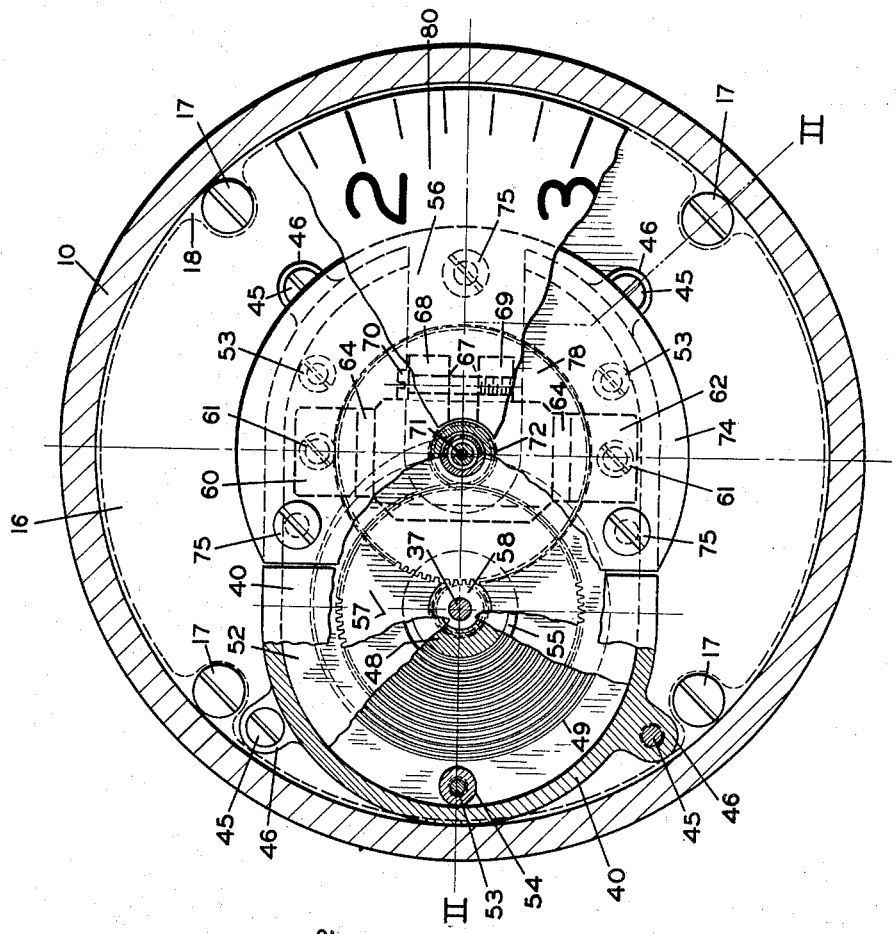
Fig. 2 is a view on line I—I of Fig. 1.

Mounted on the cast frame 40 is a supporting bridge, designated generally by reference character 60. This bridge may be secured to the cast frame 40 as by screws 61. It may be cast in one piece and comprises a front wall 62 and a rear wall 63 maintained in spaced relation by a pair of oppositely disposed spaced walls 64 connecting said front and rear walls (see Fig. 1. Only one of said spaced connecting walls shows since the drawing is in cross section on line II—II of Fig. 2.)

The rear wall 63 of said bridge 60 is provided with an opening in which is mounted a jewel bearing 65. The front wall 62 is provided with an opening in which is mounted a jewel bearing 66. The front wall is split to provide a slot 67 through its upper portion to the opening supporting the jewel bearing 66 (see Fig. 2). Protuberances from the front wall provide lugs 68 and 69 through which may pass a clamping bolt 70; this arrangement providing means for facilitating assembly of parts now to be described and for anchoring the jewel bearing 66.

Mounted for rotation in bearings 65 and 66 is a shaft 71 provided with a securely fixed relatively small gear or pinion 72 which meshes with gear 57 fixed to shaft 37. This shaft 71, sometimes called hand staff pinion shaft, has mounted thereon a pointer 73 which may be designated, for convenience of description, as the long pointer or hand.

It may be noted that the oppositely disposed pair of walls 64 connecting front wall 62 and rear wall 63 of the supporting bridge 60 are in spaced parallel relation and sufficiently far apart to permit therebetween free rotation of pinion 72.

Also mounted on the cast frame 40 is a front plate 74 which is secured thereto as by screws 75. This plate is provided with an opening in which is mounted a journal 76. Mounted for rotation in this journal is a hollow shaft or sleeve 77, concentric with the long pointer shaft 71 and of sufficient internal diameter to permit freedom of rotation of said shaft 71. On the inner end of said hollow shaft 77 is fixedly mounted a relatively large gear 78 which meshes with pinion 58. On the outer end of said hollow shaft 77 is mounted a pointer 79 which may, for convenience of description, be designated the short pointer or hand.

Figure 3:
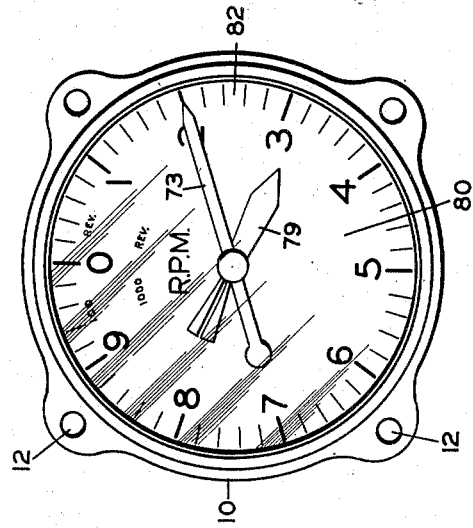
Fig. 3 is a front view in elevation of the instrument shown in Figs. 1 and 2.

On the face of front plate 74 is mounted a dial or face plate 80 and secured as by means of screws 81 extending into frame 40. The dial may be divided or graduated adjacent its periphery as shown in Fig. 3, providing an arcuate or circular indicating scale 82. It is preferable to have the scale 82 graduated according to the decimal system so that the long pointer 73 may indicate thousands, hundreds or tens and the short pointer hundreds, tens or units, as may be desired.

In operation it will be understood that shaft 11 will be caused to rotate in a counter-clockwise direction (reckoned from the front of the instrument) by the engine the R. P. M. of which is to be indicated or measured. This will cause a rotation of magnet 25 and in response the drag cylinder 36 will rotate until the oppositely biased torque of spring 49 counter balances the torque of the drag cylinder. Meantime, gears 57 and 58 have undergone an angular displacement from zero position at which position the pointers 73 and 79 were at zero position on the scale 82.

Assuming the engine to be operating at 3200 R. P. M. then the shaft 71 will, by reason of the gear ratios selected and the calibration of the device, have undergone an angular displacement of 3.2 revolutions while the shaft 71 will have undergone an angular displacement of .32 revolution. Correspondingly, the pointers indicate 3200 R. P. M. on the scale 82; the short pointer reading very readily in thousands and the long pointer in hundreds. It will be observed that the gear ratios of the various gears may be selected so that the long pointer may be caused to have a relatively large number of revolutions while the shaft upon which the calibrating spring is fixed undergoes a relatively small angular displacement. This is particularly advantageous for the reason that available coil springs have a tendency to buckle upon a few turns of the shaft to which it is fixed. According to the invention, a tachometer is provided which avoids this drawback.

In addition, errors as a result of friction torques created on shafts 71 and 37 by the effects of circular vibration are substantially minimized or entirely eliminated by the provision to rotate said shafts in opposite directions through meshing gears 51 and 72. If the instrument is subjected to a circular clockwise direction (reckoned from the front) the friction torques created at the bearings of the shafts tend to rotate the shafts counter-clockwise. But on account of the gearing causing the shafts to rotate in opposite directions, the torques are balanced out with the result that there is no rotation due to these torques and thus no error is introduced by circular vibration.

In the drawings accompanying and forming part of this specification, certain specific disclosure of the invention is made for purposes of explanation, but it will be understood that the details may be modified in various respects without departure from the broad aspect of the invention and while certain novel features of the invention have been disclosed and are pointed out in the annexed claims, it will be understood that various omissions and changes may be made by those skilled in the art without departing from the spirit of the invention.

What is claimed is:

1. A rate of motion indicator comprising a first shaft to be connected to an engine or the like and rotatable at a rate proportional to the engine speed, a second rotatable shaft mounted in two spaced bearings, means between said first and second shafts for exerting a torque on the second shaft proportional to the angular velocity of the first shaft, yielding means connected to said second shaft counteracting the torque of said means between the first and second shafts and biased to cause an angular displacement of said second shaft proportional to the torque of said means between the first and second shafts, a third rotatable shaft mounted in two spaced bearings, a gear train connecting said second and third shafts to cause said third shaft to be angularly displaced in the opposite direction to the displacement of said second shaft and through a greater angle than said second shaft, the moments of inertia of said second and third shaft being substantially proportional to the ratio of transmission of said gear train, and indicating means connected to said third shaft, whereby error torques created at the second and third shaft by oscillatory vibrations acting on the instrument will be canceled out.

2. In a tachometer, a first shaft to be connected to an engine and rotatable at a rate proportional to the engine speed, a second shaft mounted in two spaced bearings, a magnetic drag means between said first and second shafts for exerting a torque on said second shaft proportional to the angular velocity of the first shaft, yielding means connected to said second shaft opposing the torque of said magnetic drag means and biased to cause an angular displacement of said second shaft proportional to the torque of said magnetic drag means, a third shaft mounted in two spaced bearings, a gear train connecting said second and third shafts to cause said third shaft to be angularly displaced simultaneously a greater amount than said angular displacement of said second shaft and in an opposite direction to the angular displacement of said second shaft, the moments of inertia of said second and third shaft being substantially proportional to the ratio of transmission of said gear train, a fourth shaft, means connecting said fourth and second shafts to cause said fourth shaft to be angularly displaced in the same direction as the angular displacement of said third shaft and at a slower angular velocity, and indicating means connected to said third and fourth shafts, whereby error torques created at the second and third shaft by oscillatory vibrations acting on the instrument will be canceled out.

3. In a tachometer, a rotatable first shaft to be connected to an engine, a rotatable second shaft mounted in two spaced bearings, magnetic drag means between said first and second shafts for exerting a torque on said second shaft proportional to the angular velocity of the first shaft, a calibrating spring connected to said second shaft opposing the torque of said magnetic drag means and biased to cause an angular displacement of said second shaft proportional to the torque of said magnetic drag means, a third shaft mounted in two spaced bearings and having a smaller moment of inertia than said second shaft, a large gear on said second shaft and a small gear on said third shaft meshing to connect said second and third shafts to cause said third shaft to rotate in an opposite direction to the rotation of said second shaft and through a greater arc, and an indicating means connected to said third shaft, whereby error torques created at said second and third shaft by oscillatory vibrations acting on the instrument will be canceled out.

PAUL KOLLSMAN.